United States Patent [19]

Pettigrew et al.

[11] Patent Number: 4,928,132
[45] Date of Patent: * May 22, 1990

[54] OPTICAL DATA STORAGE MEDIUM

[75] Inventors: Robert M. Pettigrew, Foxton; Victor C. Humberstone, Stapleford; Keith Gardner, Trumpington; Robert J. Longman, Coton; Peter R. Helfet, London, all of Great Britain

[73] Assignee: Plasmon Data Systems, San Jose, Calif.

[*] Notice: The portion of the term of this patent subsequent to Feb. 9, 2005 has been disclaimed.

[21] Appl. No.: 153,059

[22] Filed: Feb. 8, 1988

Related U.S. Application Data

[63] Continuation of Ser. No. 915,619, Oct. 6, 1986, Pat. No. 4,724,444, which is a continuation-in-part of Ser. No. 535,866, Sep. 26, 1983, Pat. No. 4,616,237.

[30] Foreign Application Priority Data

Sep. 27, 1982 [GB] United Kingdom ............... 8227500

[51] Int. Cl.$^5$ ................... G01D 15/34; B05D 3/00; B32B 15/04; G03C 1/00
[52] U.S. Cl. ................... 346/135.1; 427/299; 427/304; 427/402; 427/404; 428/333; 428/612; 428/913; 430/495; 430/502; 430/508; 430/945
[58] Field of Search ............ 346/135.1, 137, 766; 427/299, 304, 402, 404; 428/333, 612, 913; 430/495, 508, 945, 502

[56] References Cited

U.S. PATENT DOCUMENTS

| | | | |
|---|---|---|---|
| 3,875,024 | 4/1975 | Picquendar et al. | 204/5 |
| 4,032,691 | 6/1977 | Kido et al. | 428/304 |
| 4,245,229 | 1/1981 | Stephens | 346/135.1 |
| 4,284,689 | 8/1981 | Craighead et al. | 428/620 |
| 4,298,975 | 11/1981 | van der Veen et al. | 369/94 |
| 4,318,112 | 3/1982 | Kivits et al. | 346/135.1 |
| 4,344,816 | 8/1982 | Craighead et al. | 56/643 |
| 4,422,159 | 12/1983 | Craighead et al. | 365/127 |
| 4,426,437 | 1/1984 | Fisch et al. | 430/166 X |

FOREIGN PATENT DOCUMENTS

| | | |
|---|---|---|
| 2235574 | 7/1973 | Fed. Rep. of Germany . |
| 1328152 | 4/1963 | France . |
| 2497994 | 7/1982 | France . |
| 52-143838 | 11/1977 | Japan . |
| 54-107308 | 8/1979 | Japan . |
| 1462618 | 1/1977 | United Kingdom . |
| 1505344 | 3/1978 | United Kingdom . |
| 2061594 | 5/1981 | United Kingdom . |
| 2061595 | 5/1981 | United Kingdom . |

OTHER PUBLICATIONS

Claphman & Hutley, "Reduction of Lens Reflexion by the Moth Eye Principle," Nature, vol. 244, pp. 281–282, 8–75.
Haller, Smith & Zory, "Optical Recording of Information of Microscopically Rough Substrates", IBM Tech. Disc. Bull., vol. 22, No. 3, p. 1234, 8–79.
Spiller et al., "Graded-Index AR Surfaces Produced by Ion Implantation on Plastic Materials", Applied Optics, vol. 19, No. 17, pp. 3022–3026, 9–80.
Craighead & Howard, "Microscopically Textured Optical Storage Media", Applied Physics Letters, vol. 39, No. 7, pp. 532–534, 10–81.
Craighead et al., "Textured Germanium Optical Storage Medium", Applied Physics Letters, vol. 40, No., 8, pp. 662–664, 4–82.
Craighead, "Optical Recording on Microscopically Textured Surfaces", CLEO, Conf. Dig., pp. 138–140, 4–82.
Wilson & Hutley, "The Optical Properties of Moth Eye Antireflection Surfaces", Optica Acta, vol. 29, No. 7, pp. 993–1009, '82.

Primary Examiner—Bruce A. Reynolds
Assistant Examiner—Gerald E. Preston
Attorney, Agent, or Firm—Poms, Smith, Lande & Rose

[57] ABSTRACT

A data storage medium is provided which is suitable for production or replication by moulding, casting, embossing or a similar process against a tool. The data storage medium comprises an optically sensitive layer at or adjacent to one surface of the medium, said one surface of the medium comprising a plurality of topographical features or structures disposed in a regularly repeating pattern, said pattern being free from undercutting so that the medium can be produced and/or replicated by molding, casting, embossing or similar process against a tool. The optically sensitive layer is preferably overcoated with a thin film of a metallic material which conforms to the topography of said surface.

19 Claims, 7 Drawing Sheets

TABLE I    PERFORMANCE OF PLAIN AND TEXTURED SUBSTRATES

| SUBSTRATE | REFLECTIVITY % | ABSORBTION % | THRESHOLD POWER | SIGNAL STRENGTH m VOLTS AT 7mW | CNR AT 7mW |
|---|---|---|---|---|---|
| UNTEXTURED POLYCARBONATE | 30·7 | 50·3 | 5·8 | 205 | 31·8 |
| SHALLOW GROOVES | 18·0 | 64·0 | 4·8 | 786 | 44·7 |
| DEEP GROOVES | 14·6 | 66·4 | 4·2 | 986 | 47·0 |

RECORDING CONDITIONS :- 2·5 METRES/SECOND 1MHz 300 nsec PULSE LENGTH 780nm WAVELENGTH 0·5NA

Fig.6. AS Fig.5. WITH A THICKER METAL COATING

OPTICAL DATA STORAGE MEDIUM

RELATED APPLICATIONS

This application is a continuation of application Ser. No. 915,619 filed 10-6-86 (which is to issue as U.S. Pat. No. 4,724,444 on Feb. 9, 1988) which itself is a continuation-in-part of application Ser. No. 535,866, filed 9-26-83 (now U.S. Pat. No. 4,616,237 issued Oct. 7, 1986).

BACKGROUND OF THE INVENTION

This invention relates to an optical data storage medium.

One class of data storage techniques comprises selectively irradiating the surface of a storage medium, the medium being such that, when irradiated at sufficient intensity and duration, its properties are altered in some manner which is readily detectable. In this way data can be written onto and read from the storage medium. The writing irradiation may be electromagnetic or particulate. The advantage of electromagnetic writing radiation is that the writing (recording) operation need not be carried out in vacuum, while that of particulate writing radiation is that for any specified resolution, or data packing density, the depth of focus is much greater than for electromagnetic writing radiation.

When electromagnetic writing radiation is used, one of the difficulties frequently encountered is that the proportion of the incident energy absorbed by the data recording and storage medium may be small, and the energy required to alter detectably its properties may be large. Either or both of these restrictions may increase the energy required to write a detectable data spot on the data storage medium, which can increase the cost of the radiator or slow down the writing speed, or both.

Strongly absorbent surfaces have been prepared by producing a surface which is rough on a microscopic scale and in which the depth of the texture is large compared with its pitch. Such a surface is described by Spiller et al in Applied Optics Vol. 19, No. 17, 1 Sept., 1980 pp 3022-3026. Such structures in the prior art are essentially characterised by the random nature of their surface texture. This random structuring was regarded as valuable since in general a surface with a random structure or texture will be more absorptive of incident radiation over a range of wavelengths. The methods proposed for the production of such surfaces, such as implantation and etching, are inherently expensive. Furthermore, surfaces which have a random texture, e.g. those made by etching techniques, cannot easily be replicated because etch pits tend to include undercut areas and are often relatively deep.

The inventors of the present invention have now determined that the random surface textures of the prior art are not necessarily optimal for the absorption of a suitable range of wavelengths, e.g. for radiation in the optical and near infra-red wavelength ranges (generally 400-1050 nanometres). An optical data storage medium has therefore been developed which is characterised by its regular surface texture.

More particularly, in one aspect the invention provides an optical data storage medium which comprises an optically sensitive layer at or adjacent to one surface of the medium, said one surface of the medium comprising a plurality of topographical features or structures disposed in a regularly repeating pattern, said pattern being free from undercutting so that the medium can be produced and/or replicated by molding, casting, embossing or similar process against a tool.

In accordance with another aspect of the present invention, there is provided an optical data storage medium having a surface or surface region which is strongly absorbent of radiation falling within a predetermined band of wavelengths, whereby the surface or surface region can be written upon by such radiation, the said surface or surface region including or having adjacent thereto a layer or heat sensitive material which has a textured surface pattern which is a regular pattern, the pitch of which is smaller than the shortest wavelength to which said surface or surface region can respond to be written upon, and the depth (peak-to-trough) of which pattern is less than 1000 nanometers, the textured surface pattern being free from undercutting so as to be suitable for production or replication by moulding, casting, embossing or similar process against a tool, information being stored on said optical data storage medium by irradiating selected areas on the surface of said medium to heat said heat sensitive material and change thereby the local reflectivity of the surface of the medium at said selected areas.

In a further aspect, the present invention provides an optical data storage medium having a surface or surface region which is strongly absorbent of radiation falling within a predetermined band of wavelengths, whereby the surface or surface region can be written upon by such radiation, the said surface or surface region including or having adjacent thereto a layer of heat sensitive material which has a textured surface pattern which is a regular pattern, the pitch of which is smaller than the shortest wavelength to which said surface or surface region can respond to be written upon, the textured surface pattern being free from undercutting so as to be suitable for production or replication by moulding, casting, embossing or similar process against a tool, and the textured surface pattern being overcoated with a thin film of a material which has a high opacity over the predetermined band of wavelengths, information being stored on said optical data storage medium by irradiating selected areas on the surface of said medium to heat said heat sensitive material and change thereby the local reflectivity of the surface of the medium at said selected areas.

In accordance with a fourth aspect of the present invention there is provided an optical data storage medium having a surface or surface region which is strongly absorbent of radiation falling within a predetermined band of wavelengths, whereby the surface or surface region can be written upon by such radiation, the said surface or surface region including or having adjacent thereto a layer of heat sensitive material which has a textured surface pattern which is a regular pattern, the pitch and depth of which are both smaller than 1000 nanometers, the textured surface pattern being free from undercutting so as to be suitable for production or replication by moulding, casting, embossing or similar process against a tool, information being stored on said optical data storage medium by irradiating selected areas on the surface of said medium to heat said heat sensitive material and change thereby the local reflectivity of the surface of the medium at said selected areas.

In accordance with a fifth aspect, the present invention provides an optical data storage medium having a surface or surface region which is strongly absorbent of radiation falling within a predetermined band of wavelengths, whereby the surface or surface region can be written upon by such radiation, the said surface or surface region including or having adjacent thereto a layer of heat sensitive material which has a textured surface pattern which is a regular pattern comprising an arrangement of grooves or protuberances, the pitch of which is smaller than the shortest wavelength to which said surface or surface region can respond to be written upon, and the depth (peak-to-trough) of which pattern is at least 20 nanometers, the textured surface pattern being free from undercutting so as to be suitable for production or replication by moulding, casting, embossing or similar process against a tool, information being stored on said optical data storage medium by irradiating selected areas on the surface of said medium to heat said heat sensitive material and changes the local reflectivity of the surface of the medium at said selected areas.

DESCRIPTION OF THE PREFERRED EMBODIMENTS

In some embodiments of the invention, the entire surface of the data storage medium is formed with a textured surface pattern as defined above. In other embodiments, this structure is present only in one or more selected surface regions of the data storage medium.

Preferably, an optical data storage medium of this invention has said optically sensitive layer overcoated with a thin film of a metallic material which conforms to the topography of said surface. The depth of said regular pattern is preferably at least 20 nanometers, more preferably in the range 50 to 700 nanometers. The metallic material is preferably an alloy, advantageously an alloy which includes platinum or a platinoid metal.

The heat-sensitive material is preferably a material which undergoes a large volume change on degradation, and advantageously is a plastics material. Given that the textured surface pattern is free from undercutting, the use of plastics materials helps in simplifying the production and replication processes required to manufacture the data storage media of this invention. A wide range of plastics may be used; preferred plastics are poly(methylstyrene), polyformaldehyde, polymethacrylic acid and polymethacrylic esters, e.g. poly(methylmethacrylate), polycarbonates, polyesters and poly(vinyl chloride). Techniques suitable for the production and replication of plastics materials incorporating the required textured surface pattern include injection moulding, compression moulding, casting and embossing.

A variety of different patterns may be used as the textured surface pattern. The essential requirement is that the pattern is regular and is free from undercutting. Usually, the appearance of the pattern will resemble an arrangement of grooves or an array of protuberances. With a groove-type pattern, the grooves may be arranged concentrically, radially, in parallel or as a single spiral or as concentric spirals. The textured surface pattern may include two sets of superimposed grooves—if there are two superimposed sets of parallel grooves, the surface pattern will take the form of a crossed grating. With such a crossed grating, the two sets of grooves can conveniently intersect orthogonally, but this is by no means an essential requirement. Other multi-set configurations include (a) a set of concentric grooves with a superimposed set of radial grooves; (b) a single spiral groove with a superimposed set of radial grooves; and (c) two adjacent but non-intersecting arrays of parallel grooves.

When the pattern resembles an array of protuberances, the pattern can be considered as sets of intersecting grooves. The textured surface pattern will therefore be described hereinafter by reference to grooves. Particularly preferred are patterns made of parallel grooves of sinusoidal form either extending in one direction only (i.e. single sine wave form) or intersecting orthogonally (i.e. crossed sine wave form).

Insofar as patterns or gratings of single sine wave form are concerned, tests show that reflectivity from such a pattern using radiation with a polarisation perpendicular to the grooves is low, typically less than 10%, i.e., suitable for writing data. However, with radiation polarised parallel to the grooves, reflectivity is high (at least 30%) as is suitable for reading data.

The pitch of the grooves must be smaller than the shortest wavelength which is to be used for writing in order to achieve effective writing on the data storage medium. Preferably, the pitch of the structure is less than half the wavelength of the electromagnetic radiation which is to be used for writing. This radiation will usually be within the ultraviolet, visible or infrared regions of the electromagnetic spectrum. Generally, the pitch of the grooves will be within the range 100–500 nanometres.

The depth of the grooves is generally at least 20 nm, and is preferably less than 700 nm. Where the textured surface pattern consists of a single set of grooves, good results have been obtained where the groove depth is about 400 nm and the pitch of the grooves is within the range 200–300 nm. For the avoidance of doubt, all references herein to the depth of a groove relate to the peak-to-trough depth. Thus if the groove is sinusoidal in form, the depth equals twice the amplitude of the sine wave.

Advantageously, the wavelength of light used to record information on an optical data storage medium of this invention is in the range 1.5P–4P, where P is the pitch in nanometres of the sinuous surface texture.

The textured surface pattern is preferably overcoated with a thin film of a metal which comprises platinum or an alloy or platinum, and the thickness of the overcoating is preferably such as to give a transmission of no more than about 20%, preferably no more than 10%, of incident radiation over the predetermined band by wavelengths. The overcoating metal conforms to the texture of the substrate—that is, it displays the regular pattern of the material onto which it is coated. The film must be sufficiently thin that it does not deleteriously affect the form of the textured surface pattern.

Data storage media in accordance with the present invention are highly absorptive of incident electromagnetic radiation within the predetermined band of wavelengths. The absorption of radiation at the textured surface pattern on the data storage medium causes an observable change in the heat-sensitive material. Thus selective irradiation of the textured surface pattern will result in local heating at the positions of incident radiation, thereby causing local effects such as blistering or ablation of the material, for example by degradation of a polymer to monomeric species. Such structural changes cause localised changes in the optical properties of the material.

The reading of information stored on a data storage medium of this invention will be effected by a technique appropriate to the nature of the changes in properties undergone by the heat sensitive material on writing, e.g. by observing changes in reflectivity of the medium using a readout beam the wavelength and/or intensity of which is such that the readout beam is not significantly absorbed by the data storage medium. Changes in optical transmissivity may be used instead of changes in reflectivity.

The present invention enables a strongly absorbent data storage medium to be produced cheaply and easily by plastics moulding, casting, embossing or similar process employing a tool, and using mass-production techniques.

Preferred forms of the present invention may provide economically a data storage medium having a strongly absorbtive surface of low thermal capacity. In some examples there can be provided such a surface the properties of which can be altered by the absorption of only a small quantity of energy.

One technique for manufacturing a data storage medium in accordance with the present invention is as follows, starting with the production of the tool:

(1) A thin film of resist is deposited onto a smooth surface.
(2) The resist is exposed in a suitable pattern of the type already described, e.g. by a laser interference technique.
(3) The resist is developed.
(4) A negative replica of the resist surface is produced by first forming a thin electrically conducting layer on the resist and by electroplating onto that laser a further layer of metal thick enough to be durable.
(5) The electroplated metal layer from the resist may then be stripped from the resist, although this is not essential.
(6) An electroplated positive metal replica (to act as a master) is then formed from the negative metal replica (which constitutes the replicating tool).
(7) A plastics replica is then formed from either the positive or directly from the negative metal replica.
(8) A thin film of platinum or of a Pt/Au or Pt/Cr alloy is then deposited on the plastics replica. This metallised plastics replica provides a strongly absorbtive surface, ready for writing, and constitutes the data storage medium, which may function for example as a digital or analogue information storage medium. Steps (7) and (8) can be repeated in a mass-production process.

Within the scope of the above process many variations are possible:

Step (1). The resist may be for example photoresist or electron beam resist. It may be deposited for example by spinning, dipping, spraying or any other suitable technique.

The surface on which it is deposited may be flat or curved e.g. cylindrical, conical, spherical or other suitable shape.

Steps (2/3). The pattern must satisfy the requirements set forth above in relation to the textured surface pattern of the data storage medium. The pattern may be imaged onto the resist by any one of a variety of methods, including writing with an electron beam, or by the production of interference fringes either as a pattern of parallel bars or as two patterns of bars at an angle (possibly 90°) to each other. Laser interference is a valuable technique for generating an array of intersecting grooves or a set of concentric grooves. For example, two laser beams may be focussed in one dimension to form an interference pattern in the form of a series of spots. The resist-coated substrate may be moved (e.g. by rotation or translation or by a combination of rotation and translation) beneath this interference pattern to generate the desired exposure. Electron beam recording is another valuable technique which can be used with either the single spot recording or multiple spot recording techniques. Another recording technique of use in this invention involves recording harmonic fringes generated by a diffraction grating. The diffraction grating itself may have circular, spiralor straight-line rulings, and is illuminated with collimated light. This produces images in the form of harmonics of the grating at set distances from the grating, and these images result in exposure of the photoresist.

Step (4). An alternative first stage is to produce a negative first stage replica using the techniques commonn in replication of ruled spectroscopic gratings e.g. first applying a very thin coat of a release agent such as mannitol to the original, and casting a layer of a thermosetting plastics against it. This technique causes minimum damage to the original, so that several first generation replicas may be obtained.

Step (7). The product replica may be formed from the metal tool by any one of a number of proceses including casting, injection or compression moulding or embossing, the last two using such details of technique as are well known in the arts of gramaphone record or videodisc manufacture.

Instead of using a resist which is exposed and developed in order to generate the desired textured surface pattern, steps (1)–(3) above can be replaced by a mechanical cutting or an optical cutting step which generates directly the desired textured surface pattern in a plastics or metal substrate. Mechanical cutting may be formed using an a piezo-electrically driven stlus. Optical cutting can be achieved using UV lasers and appropriate optics or multiple spot techniques. Radial grating may be produced by modulating the laser beam with such a technique. Cutting may also be effected directly using an electron beam.

In use the finished absorbent surface on the data storage medium is written by iradiating any desired area, tyically with radiation from a laser which may be a diode laser. Sufficient energy density may be applied to alter permanently the surface. This alteration is evident as a change in the reflectivity or transmissivity of the surface and may be detected by any suitable electro-optic device.

Where the textured surface pattern comprises a crossed grating arrangement, the absorption of incident radiation when the data storage medium undergoes the writing (recording) process causes an observable change in the heat-sensitive material,e.g. as a result of degradiation of the heat sensitive (generally plastics) material; this results in destruction of the local surface texture or pattern in the overcoating metal layer at points of incident radiation, the overcoating platinum or platinum alloy layer remaining intact (without rupture) but being spaced from the underlying plastics material. Surprisingly, we have found that the plastics material retains its surface pattern, despite the degradation or ablation of (presumably) several molecular layers of the material, although the depth of the surface structure will be decreased to an extent which is readily observable with an electrin microscope. Where there is an overcoating metallic layer, the degradation products are to the best of our belief retained by the metal layer and are not lost to the atmosphere. In all embodiments, the writing process results in a local change in the absorption characteristics of the medium, degradation of the plastics material giving an increase in reflectivity. Thus the data storage medium can be read by measuring its reflectivity.

Where the textured surface pattern consists of non-intersecting grooves, the surface absorbs incident radiation of a given polarisation only. The effect of absorbing such incident radiation is the same as described above in relation to a crossed grating type of structure. In order to read information carried on such a data storage medium, two techniques are available. In the first, radiation of the same type as used for writing information on the data storage medium, but of considerably reduced intensity, is used to read the information. In the second, the information on a data storage medium is read using a beam which is orthogonally polarised with respect to the beam which is used to write information on the data storage medium. Because of the nature of the textured surface pattern, the "read beam" will not be absorbed.

In some embodiments, the heat-sensitive material (.e.g a material which undergoes a large volume change on degration) is present in the medium adjacent to a layer of a material which is highly heat-sensitive and, at a lower power density than is needed to alter permanently the absorbent surface, a spot on the adjacent layer is heated by conduction. The adjacent heat sensitive layer may be of any form, for example it may be a metallic layer, so that in some embodiments the heat-sensitive material is positioned between a metallic overcoating layer and metallic under-layer. In such embodiments the metallic underlayer preferably has a higher melting point or a lower thermal conductivity or a lower specific heat than the overcoating layer. Such structures have a beneficial effect on the stability of the film and increase the sharpness of the recording threshold. Also a low Curie point material so that Curie point writing may be used.

The reasons for the high absorption of incident electromagnetic writing radiation by data storage media in accordance with the present invention are not completely understood. However one explanation is that the structuring of the surface in the form of a regularly patterned texture, e.g. protruberances, creates a gradient in refractive index between air and the substrate. This results in a reduced reflectivity at the air material interface. Theoretical calculations of this effect have been made by Clapham & Hutley (Nature Vol. 244 No. 5414 pp 281-282 Aug. 3rd 1973). Reduction in the reflectivity of a metal surface by providing a surface structure has been demonstrated by Wilson & Hutley (Optica Acta Vol. 29 No. 7 p. 1004, 1982).

An alternative explanation is that absorption in a non-planar metal surface is effected by exciting surface plasmon waves in the metal. The surface structure allows strong coupling beteen the electromagnetic radiation and the surface plasmon waves. The theory predicts that the coupling is optimum for light radiation whose direction of vibration is perpendicular to the grooves.

BRIEF DESCRIPTION OF THE DRAWINGS

The above and other embodiments of the present invention may be more fully understood from the following detailed description taken together with the accompanying drawings, in which.

DESCRIPTION OF A PREFERRED EMBODIMENT

Figure 1:
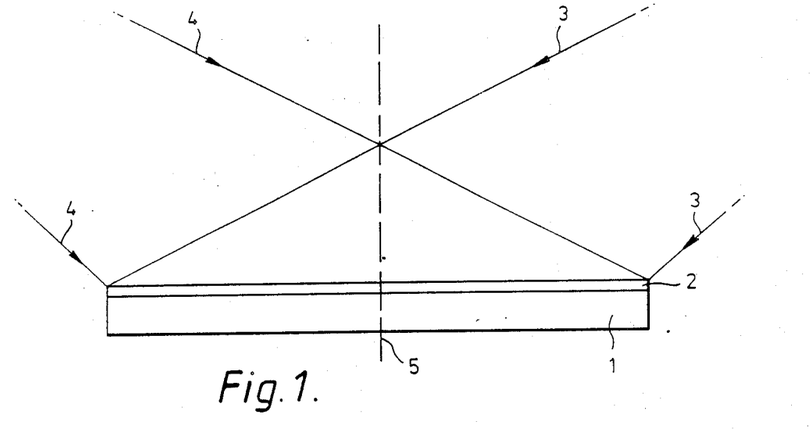
FIG. 1 is a side elevational view of a data storage medium.

There now follows a more specific description of how a suitably-patterned data storage medium may be produced, with reference to FIG. 1.

A flat, circular glass plate 1 is coated by spinning with a uniform coat of Shipley Resist Microposit 1450B. The resist is exposed to two beams of light derived via beam splitter and mirrors from the same laser. The beam splitter, lenses and mirrors are not shown as this method of setting up an interference field is well known to those skilled in the art. The wavelength and the angle between the two beams, which are illusrated by their bounding rays 3, 3 for one beam and 4, 4 for the other beam, are chosen to give fringes having a pitch in the region of 300 nm. The length of exposure is adjusted to give a depth of groove, after development, of 80 nm. After exposure, the plate and resist, 1 and 2 are rotated through 90° about the axis 5 and again exposed. The resist is then developed.

After development a very thin film of silver is deposited chemically on the resist. Nickel is then electroplated onto the silver to a sufficient thickness to be robust. The nickel is then peeled off and placed as the tool in an embossing press. Thin sheets of polycarbonate are placed in the press, heated, pressed, cooled and withdrawn. The plastics sheets are then coated, over the embossed surface, with a very thin evaporated film of platinum, typically 10 to 30 nanometres in thickness. The thickness of the film may be estimated conveniently by its light transmission. A thickness which gives a light transmission of 10% is suitable. The resultant metal-coated plastics disks constitute blank data storage media which can be written-upon by the eventual user. However, it is to be understood that there can also be mass-produced a data storage medium which is written-upon either wholly or partially. This can be done by producing a patterned blank as described, writing upon the blank, and then employing the written-upon medium as the substrate from which to produce a tool for the subsequent mas production of metal-coated plastics disks.

Figure 2:
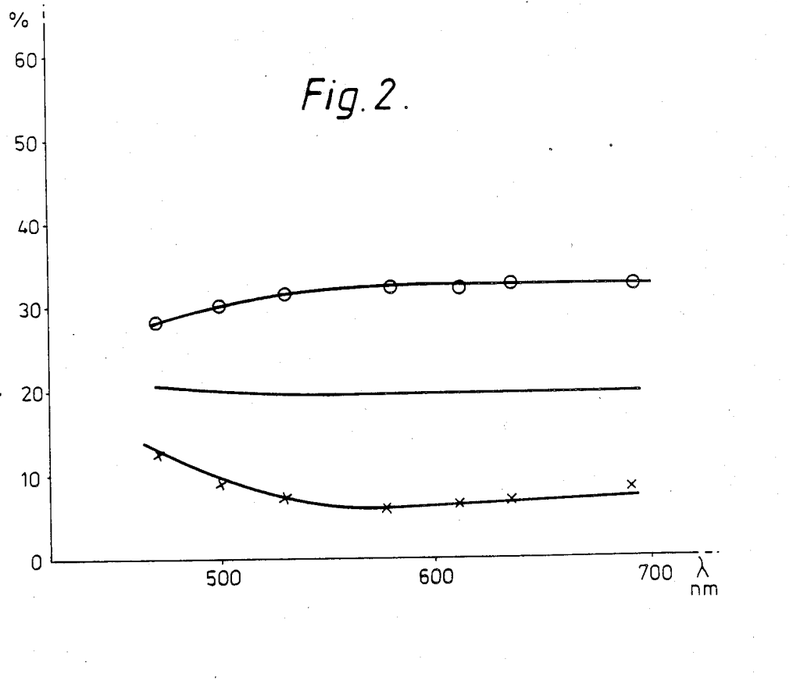
FIG. 2 is a graph of typical reflectivity.

Finally referring to FIG. 2 of the accompanying drawings, there is shown the typical reflectivity of a grating of single sine wave form. In the drawing, percentage reflection is plotted on the ordinate axis against wavelength of incident visible radiation, the grooves of the grating having a pitch of 330 nm and a height of 350 nm. The plots marked p indicate reflectivity with polarisation parallel to the grooves, the plots "X" indicate the reflectivity when polarisation is perpendicular to the grooves and the intermediate curve shows the mean reflectivity between the two first mentioned curves. It can be seen clearly from this drawing that when polarisation is perpendicular to the grooves, reflectivity is low, typically less than 10%, and the absorption correspondingly high and when the radiation is polarised parallel to the grooves, reflectivity is high.

Aspects of the performance of the present invention will now be set out in the following Examples.

EXAMPLE 1

Effect of Depth on Recording Performance

Three injection moulded polycarbonate substrates were vacuum coated with identical Pt layers of approximately 17 nm. The first substrate was a plain untextured surface (not falling within the scope of the invention) while the second and third had moulded sine wave gratings of different depths in accordance with the invention.

Figure 3:
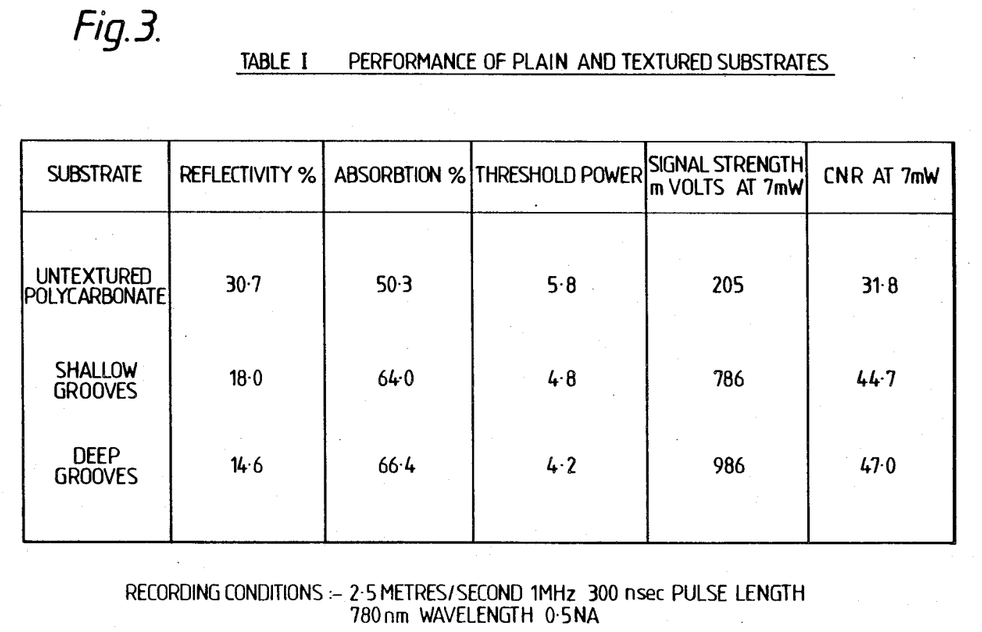
FIG. 3 is a Table giving data to which reference will be made hereinafer.
Figure 4A:
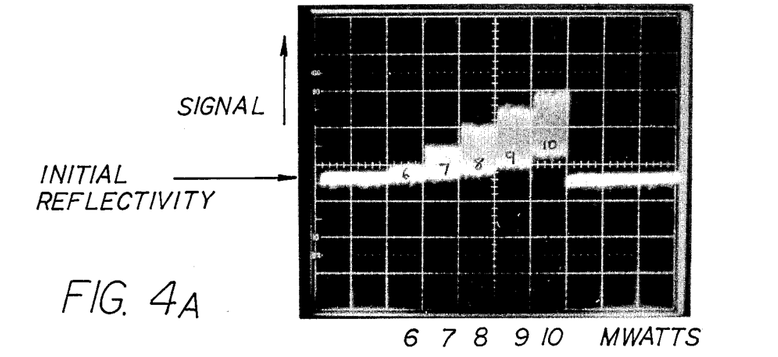
FIG. 4 is a series of photographs of a CRT display illustrating the performance characteristics of the present invention.
Figure 4B:
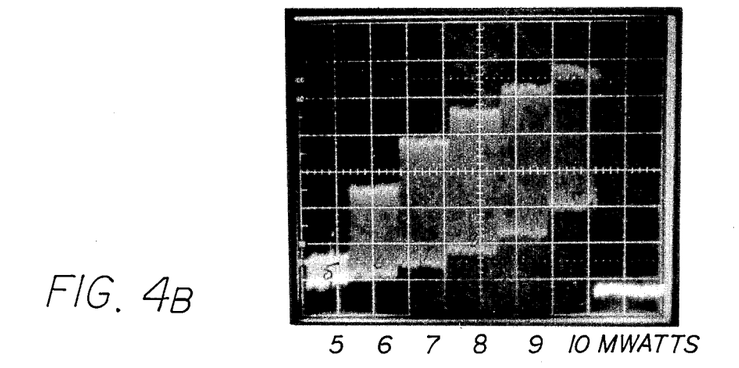
Figure 4C:
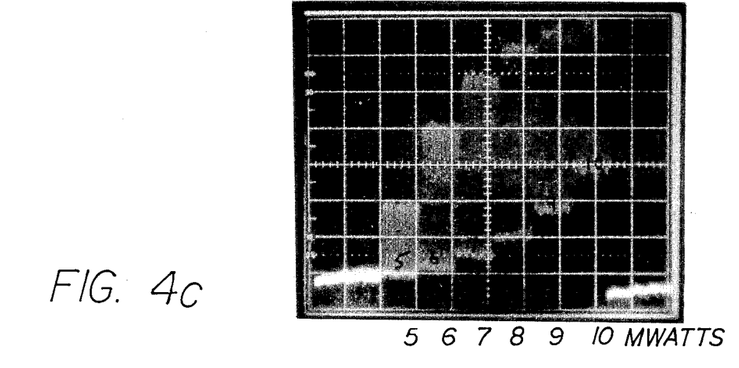

The disks were tested on a custom read/write tester under the conditions and with the results given in the Table which constitutes FIG. 3. The Reflectivity and recording characteristics are presented in the photographs which constitute FIG. 4. From these results the reflectivity suppression can clearly be seen along with the increased absorbtion, improved sensitivity and dramatic increase in signal levels.

EXAMPLE 2

Interaction Between Grating Depth and Metal Coating

Various combinations of grating depth and metal thickness can be used to produce a recording medium. In general the mechanism can be modelled as follows:
  (a) The maximum reflectivity of the recorded marks is a function only of the metal thickness.
  (b) The initial reflectivity is a function of both the metal thickness and the depth of grating.
  (c) The rate of change of signal as a function of power (the "sharpness of the threshold") is a function of metal thickness and grating depth.

This could be represented by equations of the form $$R_{max} = K_1 \times \text{thickness} - 1$$
$$R_{min} = K_2 \times \text{thickness} - 2$$
$$\frac{\text{Signal}}{\text{power}} = K_3 \times \frac{\text{(grating) depth}}{\text{thickness}} - 3$$

A two by two matrix experiment was conducted to confirm the general form of the expressions. The results are presented graphically in FIGS. 5 and 6.

From the graphs it can be seen that Equation (1) is satisfied. In each case the reflectivity at saturated recording conditions is independent of the grating structure but increases with coating thickness (compare FIG. 5 maximum with FIG. 6 maximum).

Figure 5:
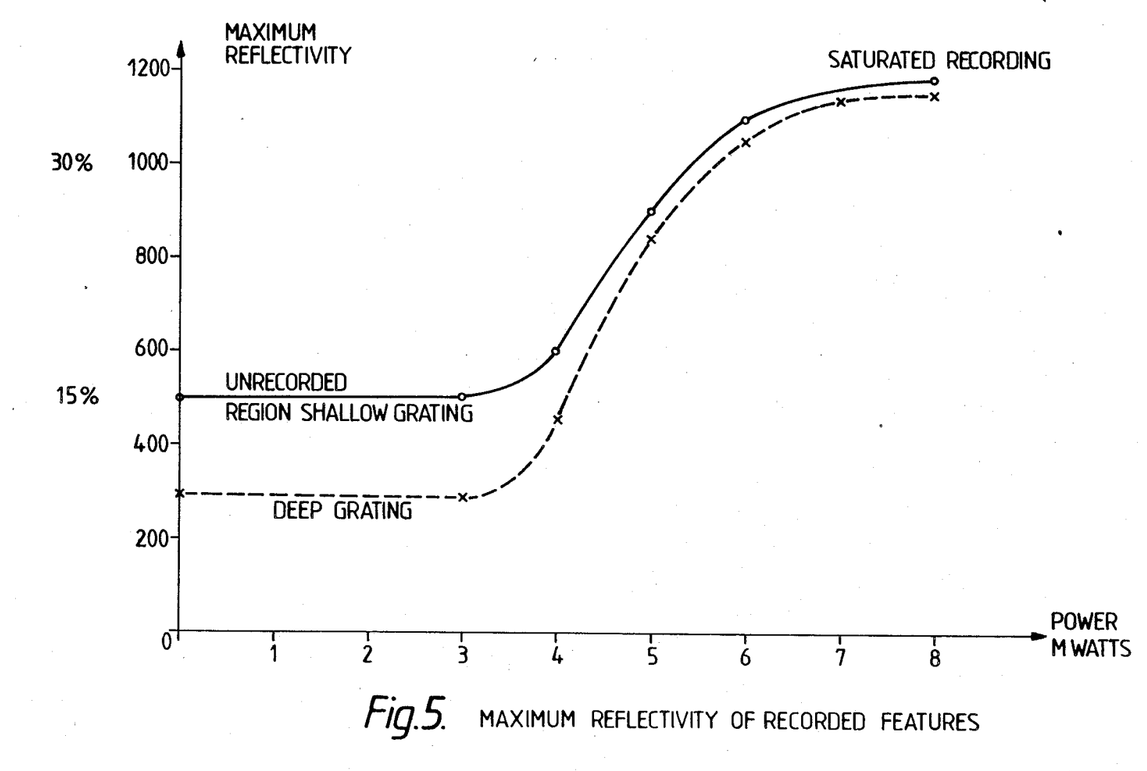
FIGS. 5 and 6 are graphs illustrating the relationship between grating depth, metal layer thickness and performance in the present invention.
Figure 6:
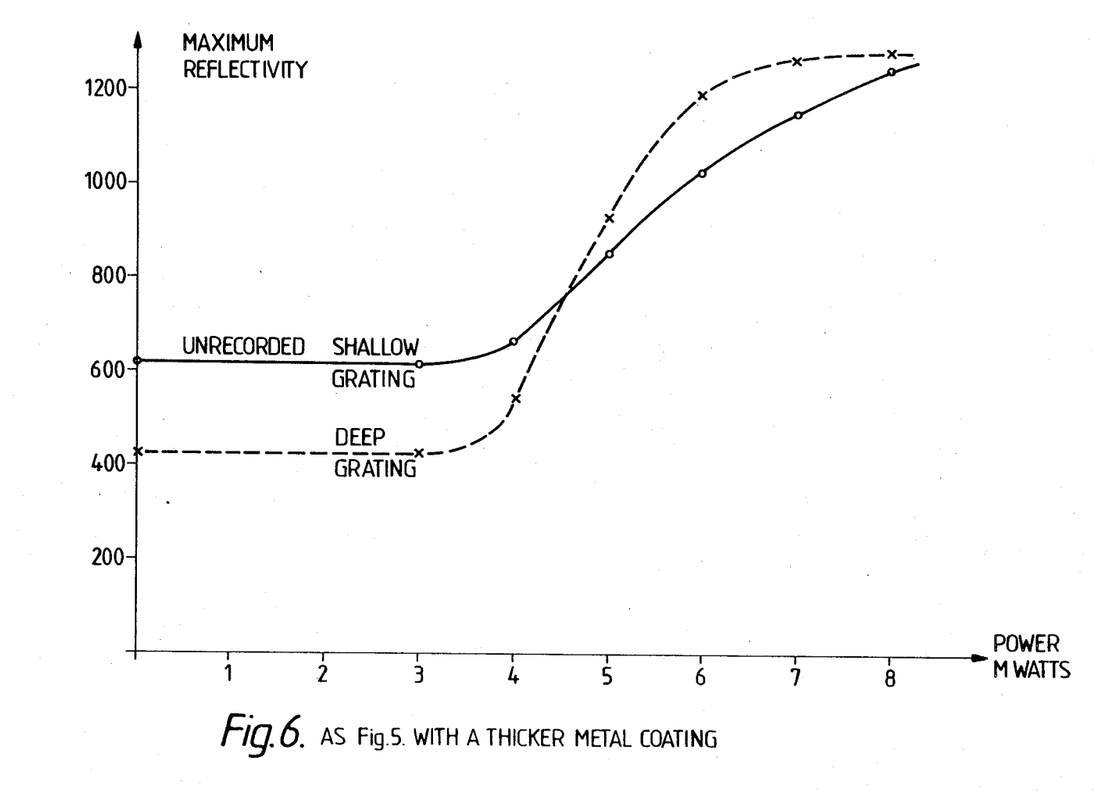

In both cases it can be seen that the deeper grating produces a lower reflectivity and that increasing the metal thickness increases the reflectivity in the general form of Equation (2).

FIG. 6 shows very clearly that the deeper grating produces a sharper threshold, i.e. the signal strength increases more rapidly as a function of power. Comparing the shallow grating results one can see that the thinner metal film also produces a sharper threshold. These two observations support the general form of Equation (3).

EXAMPLE 3

Evidence of Polymer Ablation Rather Than Flow

Figure 7A:
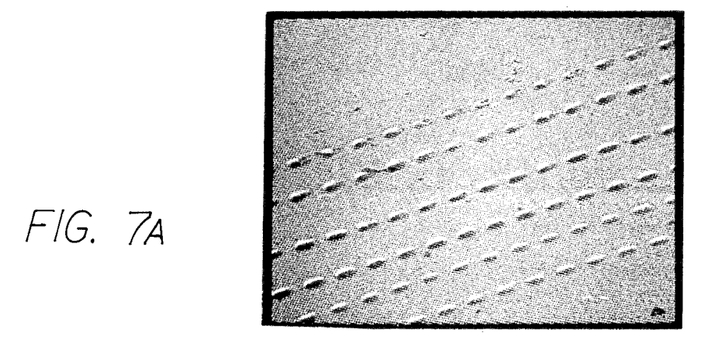
FIGS. 7 and 8 are series of photographs illustrating the recording mechanism effective in the present invention.
Figure 7B:
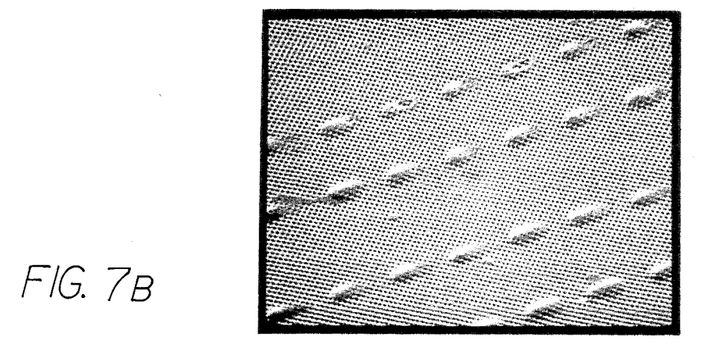
Figure 7C:
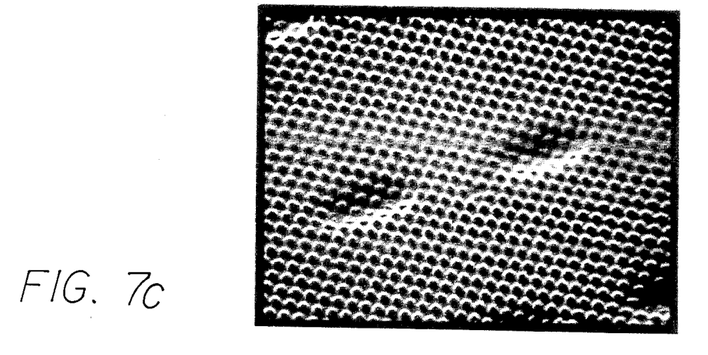
Figure 8A:
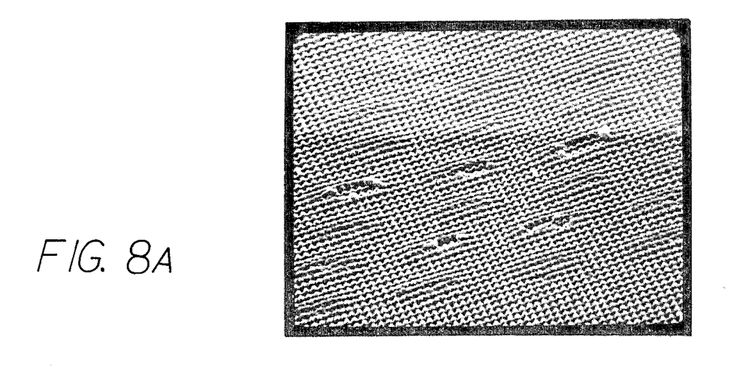
Figure 8B:
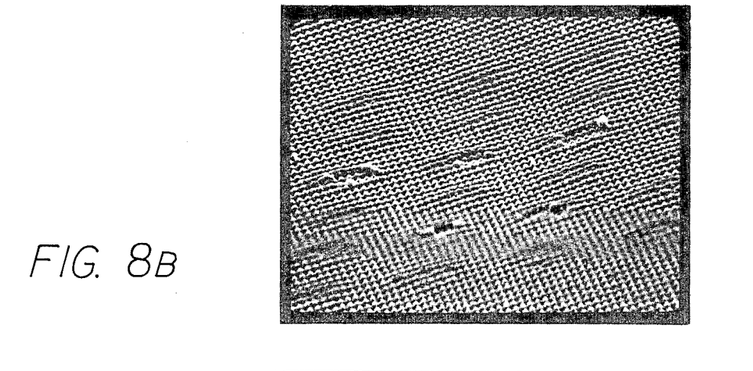
Figure 8C:
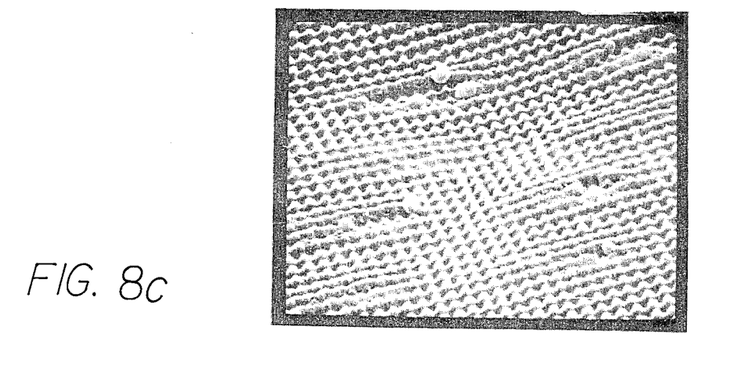

Two different substrates were coated with Aluminium rather than Platinum. In this case the metal film melts if the power is increased beyond that needed for normal recording. In the case of the normal polycarbonate substrate shown in the SEM micrographs of FIG. 7 the ruptured film can clearly be seen. In addition it is possible to see the grating structure beneath the metal which has melted. Note that the grating lines continue through the recorded mark. From these photographs it can be seen that the grating structure is still present and that the driving memchanism of the recording process does not involve melting and flattening of the polymer. Similar recordings on an Ultra Violet cured resin substrate coated with aluminium (FIG. 8) show very clearly that the metal film has melted without destroying the underlying grating. In the case of the polymer selected for this experiment very little outgassing occurs and there is much less evidence of stretching of the metal film seen in FIG. 7.

I claim:

1. An optical data storage medium which comprises an optically sensitive layer at or adjacent to one surface of the medium, said one surface of the mediium comprising a heat sensitive material having a plurality of topographical features or structures disposed in a regularly repeating textured pattern, said pattern and overcoated with a thin film of a metallic material which conforms to the topograph of said surface, being free from undercutting so that the medium can be produced and/or replicated by molding, casting, embossing or similar process against a tool.

2. An optical data storage medium having a surface or surface region which is strongly absorbent of radiation falling within a predetermined band of wavelengths, whereby the surface or surface region can be written upon by such radiation, the said surface or surface region including or having adjacent thereto a layer of heat senstive material which has a textured surface pattern which is a regular pattern, the pitch of which is smaller than the shortest wavelength to which said surface or surface region can respond too be written upon, and the depth (peak-to-trough) of which pattern is less than 1000 nanometers, the textured surface pattern being free from undercutting so as to be suitable for production or replication by moulding, casting, embossing or similar process against a tool, information being stored on said optpical data storage medium by irradiating selected areas on the surface of said medium to heat said heat sensitive material and change thereby the local reflectivity of the surface of the medium at said selected areas.

3. An optical data storage medium as claimed in claim 2, wherein the depth of said pattern is at least 20 nanometers.

4. An optical data storage medium as claimed in claim 3, wherein the depth of said pattern is in the range 50 to 700 nanometers.

5. An optical data storage medium as claimed in claim 2, whrein said textured surface pattern is overcoated with a thin film of a metallic material which conforms to the surface topography of said layer.

6. An optical data storage medium as claimed in claim 5, wherein said metallic material is an alloy.

7. An optical data storage medium as claimed in claim 5, wherein said metallic material is an alloy which includes platinum or a platinoid metal.

8. An optical data storage medium as claimed in claim 2, wherein said layer of a heat sensitive material is disposed between a metallic overcoating layer and a metallic underlayer.

9. An optical data storage medium as claimed in claim 8, wherein said metallic underlayer has a higher melting point or a lower thermal conductivity or a lower specific heat than said metallic overcoating layer.

10. An optical data storage medium as claimed in claim 2, wherein a metallic underlayer is disposed between said heat sensitive material and an overcoating metallic layer.

11. An optical data storage medium as claimed in claim 10, wherein said metallic underlayer has a higher melting point or a lower thermal conductivity or a lower specific heat than said metallic overcoating layer.

12. An optical data storage medium having a surface or surface region which is strongly absorbent of radiation falling within a prdetermined band of wavelengths, whereby the surface or surface region can be written upon by such radiation, the said surface or surface region including or having adjacent thereto a layer of heat sensitive material which has a textured surface pattern which is a regular pattern, the ptich of which is smaller than the shortest wavelength to which said surface or surface region can respond to be written upon, the textured surface pattern being free from undercutting so as to be suitable for production or replication by moulding, casting, embossing or similar process against a tool, and the textured surface pattern being overcoated with a thin film of a material which has a high opacity over the predetermined band of wavelengths, information being stored on said optical data storage medium by irradiating selected areas on the surface of said medium to heat said heat sensitive material and change thereby the local reflectivity of the surface of the medium at said selected areas.

13. An optical data storage medium having a surface or surface region which is strongly absorbent of radiation falling within a predetermined band of wavelengths, whereby the surface or surface region can be written upon by such radiation, the said surface of surface region including or having adjacent thereto a layer of heat sensitive material which has a textured surface pattern which is a regular pattern, the ptich and depth of which are both smaller than 1000 nanometers, the textured surface pattern being free from undercutting so as to be suitable for production or replication by moulding, casting, embossing or similar process against a tool, information being stored on said optical data storage medium by irradiating selected areas on the surface of said medium to heat said heat sensitive material and change thereby the local reflectivity of the surface of the medium at said selected areas.

14. An optical data storage medium as claimed in claim 13, wherein the depth of said pattern is at least 20 nanometers.

15. An optical data storage medium as claimed in claim 14, wherein the depth of said pattern is in the range 50 to 700 nanometers.

16. An optical data storage medium as claimed in claim 13, wherein said textured surface pattern is overcoated with a thin film of a metallic material which conforms to the surface topography of said layer.

17. An optical data storage medium as claimed in claim 16, wherein said metallic material is an alloy.

18. An optical data storage medium as claimed in claim 16, wherein said metallic material is an alloy which includes platinum or a platinoid metal.

19. An optical data storage medium having a surface or surface region which is strongly absorbent of radiation falling within a predetrmined band of wavelengths, whereby the surface or surface region can be written upon by such radiation, the said surface or surface region including or having adjacent thereto a layer of heat sensitive material which has a textured surface pattern which is a regular pattern comprising an arrangement of grooves or protuberances, the pitch of which is smaller than the shortest wavelength to which said surface or surface region can respond to be written upon, and the depth (peak-to-trough) of which pattern is at least 20 nanometers, the textured surface pattern being free from undercutting so as to be suitable for production or replication by moulding, casting, embossing or similar process against a tool, information being stored on said optical data storage medium by irradiating selected areas on the surface of said medium to heat said heat sensitive material and change the local reflectivity of the surface of the medium at said selected areas.

* * * * *